United States Patent [19]

Salter

[11] 4,170,898
[45] Oct. 16, 1979

[54] APPARATUS FOR CREATING SURFACE WAVES IN A BODY OF LIQUID

[76] Inventor: Stephen H. Salter, 143 E. Trinity Rd., Edinburgh EH53PP, Scotland

[21] Appl. No.: 715,403

[22] Filed: Aug. 18, 1976

[30] Foreign Application Priority Data

Aug. 20, 1975 [GB] United Kingdom ............... 34546/75
Aug. 6, 1976 [GB] United Kingdom ............... 13840/76

[51] Int. Cl.² ........................................ G01M 10/00
[52] U.S. Cl. ................................................. 73/148
[58] Field of Search ..................... 73/148, 432 SP; 318/327

[56] References Cited

U.S. PATENT DOCUMENTS

| | | | |
|---|---|---|---|
| 3,287,967 | 11/1966 | Laurent | 73/148 |
| 3,478,443 | 11/1969 | Imris | 35/19 R |
| 3,950,683 | 4/1976 | Lamson | 318/327 |
| 3,964,316 | 6/1976 | Abe | 73/148 |

FOREIGN PATENT DOCUMENTS 7900 of 1908 United Kingdom ..................... 73/148

Primary Examiner—Daniel M. Yasich
Attorney, Agent, or Firm—Harrington A. Lackey

[57] ABSTRACT

A wave maker which is capable of absorbing waves impinging thereon which comprises a displacer which can be moved back and forth by a motive means to create the waves, and which includes a control system which senses the reaction between the water and displacer and effects a control on the motive means bringing the displacer force and velocity into phase, or substantially so, enabling the wave maker thereby capable of absorbing waves impinging thereon.

14 Claims, 8 Drawing Figures

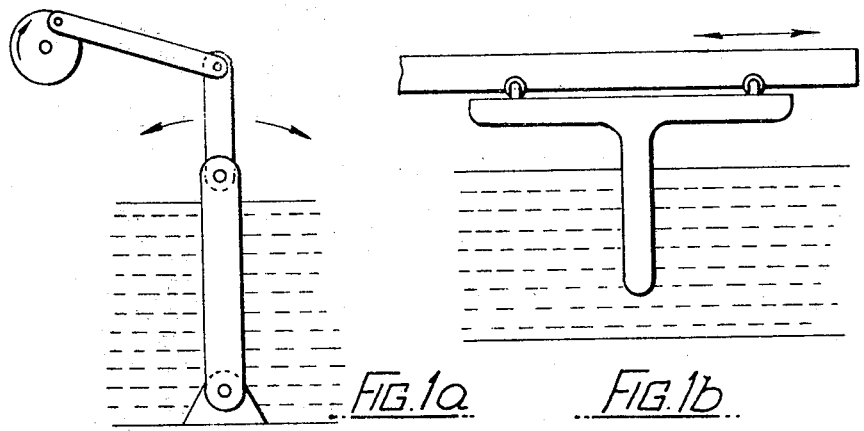
FIG. 1a   FIG. 1b
FIG. 1c
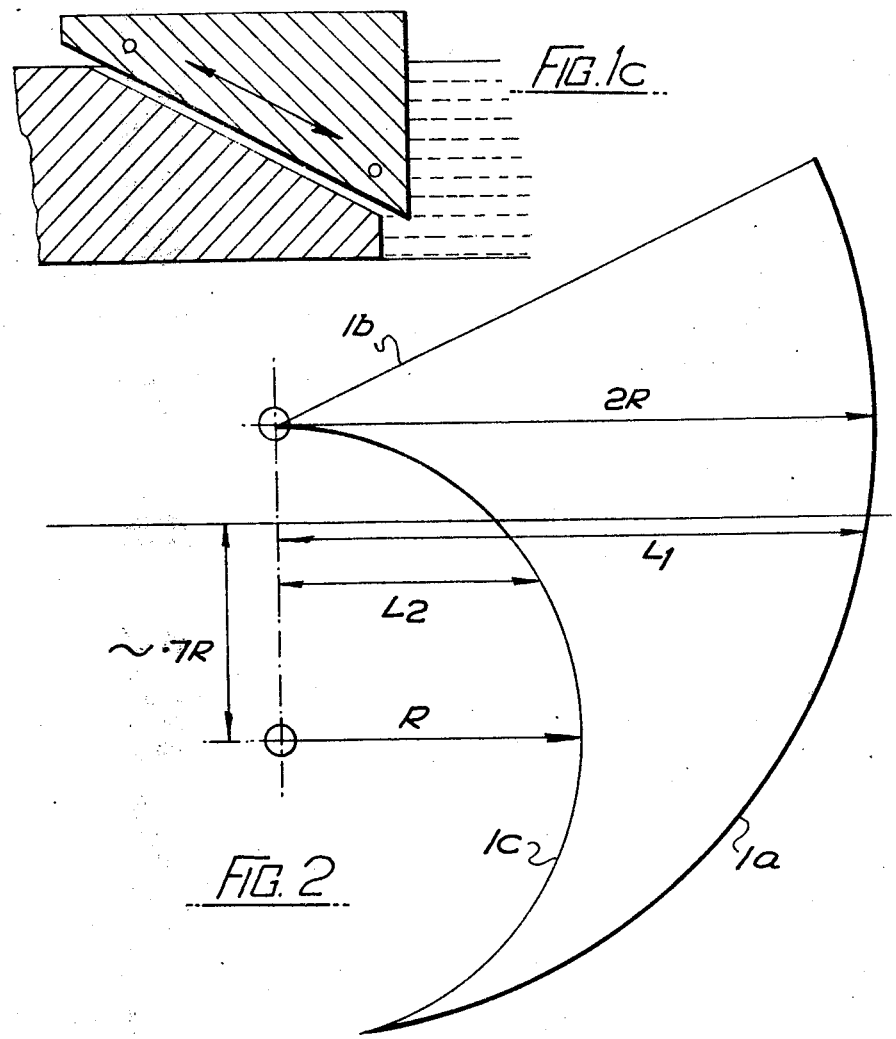
FIG. 2

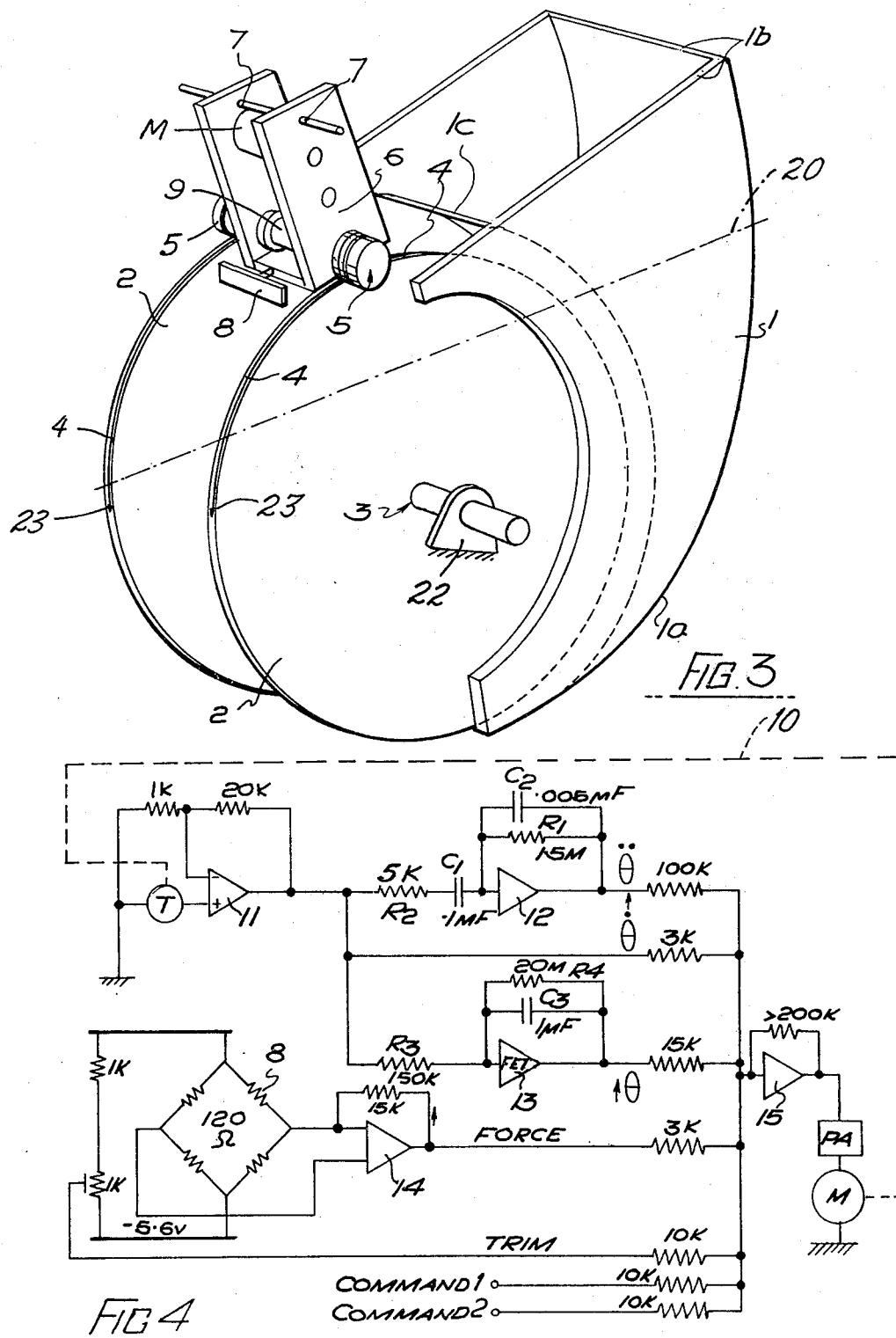

APPARATUS FOR CREATING SURFACE WAVES IN A BODY OF LIQUID

This invention relates to an improved apparatus for creating surface waves in a body of liquid.

Models of ships, oil rigs and harbour installations are tested with model waves in a test tank, and the apparatus for making these waves in an important part of the equipment in the test tank.

There are three popular kinds of known wave making apparatus, namely the flap, the piston and the wedge and these respectively are shown diagrammatically in FIGS. 1a, 1b and 1c of the accompanying drawings. The operation and descriptive name given to each will readily be understood from examination of FIGS. 1a, 1b and 1c, the arrows in each figure indicating the manner in which each displacer is moved to produce the waves. In each of these known types, the displacer is connected to and moved by a drive. The simplest drive is a continuously rotating electricmotor and a crank. FIG. 1a shows an example of a drive in the form of a motor and crank. In the known arrangements using a motor and a crank drive, the wave period is set by motor speed and the stroke of the displacer is set by crank eccentricity. It is possible to connect the displacer and motor with a linkwork which allows stroke adjustment without stopping the motor, and where it is desired that the apparatus should be capable of producing any of a desired spectrum of wave types, more complicated linkage designs using hydraulic actuator and servo-systems can be used.

In all of the known arrangements, the position of the displacer is controlled by the drive and within the limits of the strength of the mechanical parts and the drive, the water displacer is an irresistible object which is rapidly driven. This has the disadvantageous effect that, when the apparatus is used in a test tank, in general waves which are reflected back to the displacer behave as though they were striking for example a vertical cliff face and are reflected therefrom with a reflection coefficient close to unity. Waves so reflected meet with new waves being produced by the apparatus and this leads to unwanted instability in the wave pattern in the tank. Even when the displacer is not being driven, because it still behaves like a vertical cliff, the liquid surface in the test tank takes a long time to become calm.

The present invention seeks to provide apparatus for creating surface waves in a body of liquid and which has a displacer connected to a drive motive means but which, as far as reflected waves are concerned, does not behave as an irresistible object such as a vertical cliff.

According to the present invention there is provided apparatus for creating surface waves in a body of liquid comprising a liquid displacer, means for moving the liquid displacer back and forth to create the waves in the body of liquid, means for applying damping to the displacer so that in use it behaves as a damped system in which the force on the displacer and its motion are in, or substantially in, phase.

Preferably the damping is applied by means which senses the instantaneous resultant force on the displacer and produces a first drive signal dependent thereon which serves to drive the motive means, and means which senses the instantaneous velocity of the displacer and produces a second drive signal which is subtracted from the first signal thereby to apply the damping to the displacer.

Preferably also, there is a differentiating means which produces from said second signal a signal which is representative of the instantaneous acceleration of the displacer and such signal is also subtracted from the first drive signal thereby to make the system behave as though its inertia were much reduced.

Preferably also, yet another signal is derived from said second signal by integrating means and such signal is also subtracted from said first signal thereby to make the system behave as though its inherent spring stiffness were much reduced.

These arrangements contribute to making the displacer move in use as if it were a perfect, damped, force and velocity in phase system, such as a zero inertia piston which operates in a dash-pot, and is carried by a low stiffness spring, which is a system by which energy can be added to a body of liquid and extracted from it. The displacer, as the velocity thereof is in phase with the force thereon, at no time presents in effect an irresistible object to, for example, reflected waves. Also, the power required to drive the motive means is much less than that required to simply move the displacer back and forth when the force and velocity are not in phase. A further advantage of the present invention is that more predictable and stable wave patterns can be set up in the tank.

The sensing means of the apparatus are preferably electric transducers associated with an electric control circuit incorporating power amplifiers with outputs of a few hundred watts, for example, up to one kilowatt. The motive means includes an electric motor, conveniently one with a low operative inertia. A particularly suitable motor is a printed armature motor which operates through a reduction gear-box so as to give an overall speed reduction from motor to displacer of the order of 150:1.

It is desirable that the design of the liquid displacer allows the force on it, including the wave force on it to be measured accurately. This means that the piston and flap are not well suited to the present invention because, in each, waves are generated to each side of the displacer and the waves generated to one side are not used. The translating constraint of the sliding wedge is harder to make free from friction and its use in the present invention is therefore limited. Furthermore, both the piston and the wedge produce the same displacement at different depths which makes the water appear to have a larger inertia than it should.

In accordance with a preferred arrangement therefore, the motive means moves the liquid displacer in cyclic manner and suitably the liquid displacer is mounted to turn about an axis which in use is disposed slightly below the calm surface level of the body liquid, in which it is to create the waves. The liquid displacer is shaped to produce a displacement matching the pattern of water movement in the waves. It is well known that in deep water this movement pattern is a set of circular orbits. At the surface, the diameter of the orbit is equal to the wave height. Below the surface it is reduced by the factor $$e^{-2\pi d/\lambda}$$

where
 $d$ = depth and
 $\lambda$ = wave length

It is not normally practical to design a shape which matches all amplitudes of movement of all wave period mixtures at all depths, but displacers of shapes of the sort shown in FIG. 2 of the accompanying drawings can perform fairly well. If there has to be excess displacement it should not be at the surface. The hollow concave inside is equivalent to a convex rear surface but does not give large buoyancy forces which would put extra loads on the bearings. Amplitudes of excursion may be as high as 30°. Satisfactory waves with lengths between R and 10R can be generated, where R equals the radius of the rear circular profile 1c of the liquid displacer in FIG. 2. The circular profiles are easy to mark out and build. The width of the liquid displacer is preferably narrow enough so that there is a fairly small change of wave phase across the front surface of the liquid displacer for obliquely travelling waves.

Embodiments of wave making apparatus in accordance with the invention will now be described by way of example with reference to FIGS. 1 to 6 of the accompanying drawings, in which:

FIGS. 1a, 1b, and 1c, respectively and diagrammatically, show three prior art wave-making devices.

FIG. 2 is a sketch of a preferred shape of a liquid displacer,

FIG. 3 is a schematic view of the liquid displacer and associated equipment

FIG. 4 is a circuit diagram of the control network used for controlling the movement of the liquid displacer;

Figure 5:
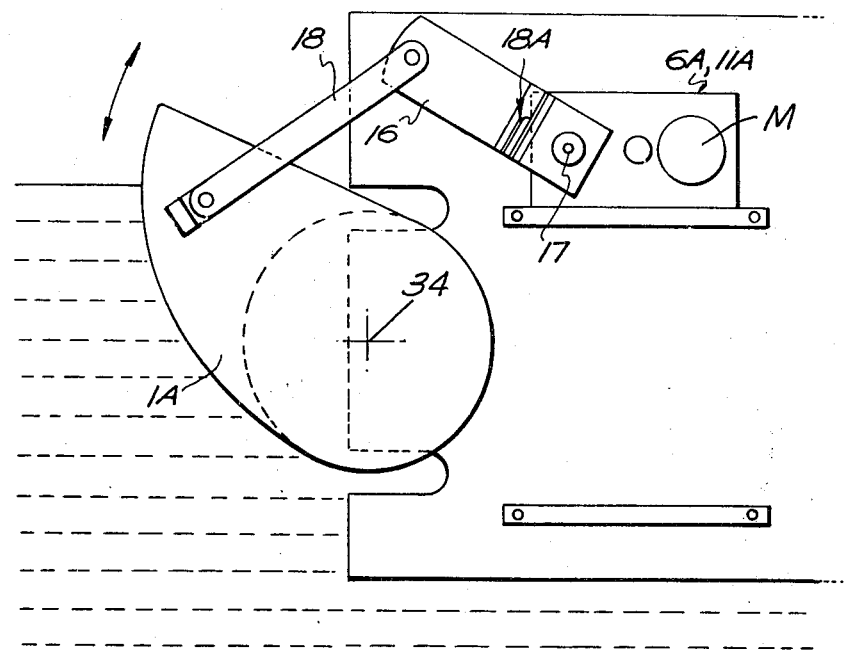
FIG. 5 shows a schematic side elevation of a modified form of wave making apparatus in accordance with the invention.

Referring to FIG. 2 in detail the displacer as shown therein in side view, is of constant width which matches the tank in which it is to be fitted. The width of the displacer is preferably sufficiently narrow so that there is a fairly small change of wave phase across the front surface of the displacer for obliquely travelling waves. The displacer is shown as a geometric shape rather than in physical embodiment and can be considered as two spaced side plates of the shape shown, connected by two curved plates 1a, 1c and the third side lying in a flat plane 1b, the displacer being rotatable about the centre of curvature of plate 1c and the centre of curvature of plate 1a lies on the line where the plane 1b meets the plane of plate 1c. The radius of curvature of plate 1a is twice the radius R of plate 1c. The displacer is adapted to be positioned in use so that the axis of rotation thereof lies 0.7R below the surface of the body of liquid in which the waves are to be generated, as shown in FIG. 2.

A displacer of the form shown in FIG. 2 is simple to fabricate because circular profiles are used for plates 1a and 1c. The waves generated by the displacer are propagated from surface 1a, and the rear of the displacer defined by plate 1c is therefore concave or "hollow". This is equivalent in use to making the side plates much larger and the plate 1c convex and lying on the opposite side of the axis of rotation to that shown in FIG. 2, except that where the rear is concave as shown, the buoyancy forces are much less, making the forces on the bearings of the displacer much less.

Referring now to FIG. 3, a displacer 1 of physical form corresponding to the geometrical form shown in FIG. 2 is mounted on a pair of spaced apart discs 2 which rotate at each end of a spindle 3. In use, the spindle 3 is mounted at a suitable distance below the calm water level 20 in bearings 22 carried on a support, not shown, outside the liquid displacer. One wire of a pair of multistrand stainless steel wires 4 is pinned upon the rim of each disc 2 at diametrically opposed points 23 (one of which is hidden on the remote side of the disc 2 in FIG. 3), and passes around the rim to a pulley 5 about which the wire takes two turns. A helical groove (not shown) of pitch just larger than the diameter of the wire is cut in each pulley 5 to control the lap of wire around each pulley 5, as each pulley rotates.

Each pulley is fixed upon the end of a shaft 9 rotatably journaled through the end walls of a bracket 6. Within the bracket 6 is an electric motor M adapted to drive the pulley shaft through gears, not shown, within the bracket 6. The bracket 6 is supported by spindle 7, which is journaled in a fixed support, not shown. The lower edge of the bracket 6 is linked to a force-sensitive transducer 8, which is stationarily mounted upon a fixed support, not shown. Thus, any tendency of the bracket 6 to rotate about the axis of the spindle 7 is resisted by the fixed transducer 8. However, the force-sensitive transducer 8 does sense the force or pressure exerted by the bracket 6 against the transducer 8.

As the discs 2, carrying the displacer 1, are oscillated back and forth by action of the motor M through the pulleys 5 and wires 4, reactive forces acting tangentially to both pulleys 5 and the discs 2, that is the tension in wires 4, are imparted to the transducer, which is calibrated to measure the reaction force exerted on the displacer 1 by the water or liquid.

A second transducer, not shown in FIG. 3, in the form of a tachogenerator T (FIG. 4) is coupled to the electrical drive motor M, such as indicated by the dashed-lines 10 in FIG. 4, in order to sense the velocity of the motor M, and hence the displacer 1.

The surfaces marked 1a, 1b and 1c in FIG. 3 are those indicated by the similar reference numbers in FIG. 2. The surface 1a and 1c extend between the arcuate side plates and define a hollow displacer body attached to the two discs 2, the body being open at the top.

As the displacer illustrated in FIG. 2 is turned while situated in the water as shown in FIG. 2, the change of volume of displaced liquid tends to make the displacer spring back and the system has an inherent springiness. The spring ratio of this springiness has the value $\frac{1}{2}p\ g(L_1^3 - L_2^3)$ Newton meters per radian per unit width, where p=density of the liquid and $L_1$ and $L_2$ have the significance shown in FIG. 2. There is also an inertia factor involved in the operation of the apparatus and this inertia is made up of the moment of inertia of the mass of the displacer plus the moment of inertia of the gear box 6 plus the moment of the inertia of the liquid influenced by the displacer. This third quantity is not easily calculated but seems to be least when the displacer is best matched to liquid movement.

When the spring term balances the inertia term and the movement of the displacer is controlled only by the damping, the apparatus functions most effectively as an energy absorber. It can be arranged that this natural frequency occurs for the wave lengths of greatest interest but the apparatus can be modified to widen the performance band. Hence, if the displacer is built with light but strong materials it will have a low inertia but will float up out of the liquid. It can be pushed back by force from a low spring rate source. In embodiments where the apparatus is small, a suitable low rate spring force can be provided by having a standing current in the drive motor. With larger said apparatus this is a waste of power and in such embodiments the force can be provided by an elastic element such as a 'Tensator' or a rolling diaphragm such as 'Bellofram', both of which give constant force.

If the buoyancy effects of such means produce a rather higher spring rate force than is desirable, this can be reduced by feeding back to the control network a signal proportional to the displacer position of such a phase that upwards movements produce a force which will lift the displacer upwards. If overdone this can result in an unstable operation where the smallest departure from the middle is increased. However, the best setting will be less than the critical amount but enough for the working range despite the low inertia. Attempts to extend the technique even further to include a negative inertia have been made but have been less successful. It is possible to send a signal proportional to acceleration to the control network in such a phase as to increase the acceleration. Then the moving parts of the apparatus would appear to have reduced inertia. Unfortunately, sensitive accelerometers have rather low maximum frequencies. As an alternative to using an accelerometer, it is possible to differentiate a velocity signal to give an acceleration signal provided that it is free from spikes and interference. A suitable velocity transducer can be made out of a microammeter movement which is linked to the support shaft of the displacer.

The electronic block diagram of the control network used with the displacer of FIG. 3 is shown in FIG. 4. Operational Amplifier 11 conditions the tachogenerator T (or other velocity sensing transducer). It should be chosen for low offset voltage. Amplifier 12 produces an acceleration signal from the velocity signal arising from T. $C_1$ and $R_1$ define the performance of the amplifier 12 at the wave frequencies. $C_2$ cuts high frequency response and $R_2$ prevents instability of the amplifier. Amplifier 13 should be chosen for low offset voltage and current. It acts as an integrator for signals at working frequencies and its performance is set by $R_3$ and $C_3$. $R_4$ cuts low frequency drift. Amplifier 14 conditions the bridge circuit which includes the transducer 8 (e.g., a strain gauge), this circuit being powered from a clean sub-stabilised supply shared only by the trim control which sets a standing current in the motor to take up gear backlash at low wave levels. In large units most of the trim force will be supplied mechanically. Amplifier 15 sums the various terms and drives a power amplifier PA. Its gain should be set as high as the imperfections of the system allow. The power amplifier drives the motor M that controls the movements of the displacer 1. The values of its input resistors will depend on the scaling factors of the various transducers. The parameter values shown in FIG. 4 are for guidance only.

The control circuit operates briefly as follows:

Any resultant reaction force exerted by the liquid medium upon the displacer 1 is transmitted through the wires 4, pulleys 5 and bracket 6 to the force-sensitive transducer 8, which converts the mechanical pressure into an electrical voltage signal to produce an unbalanced output of voltage from the bridge circuit disclosed in FIG. 4. This output signal is amplified by the amplifier 14 to produce a resultant force signal. This force signal, summed with the trim control signal and any incoming command signal are fed to and amplified by power amplifiers PA and the signal out from PA drives the motor M in the appropriate direction. The rotation of the Motor M (and hence movement of the displacer), acting through the mechanical connection 10, shown diagrammatically by the dashed line in FIG. 4, causes the tachogenerator T to issue a signal proportional to the velocity, which signal is amplified by amplifier 11 and this signal is subtracted from the signal driving the motor M causing it to slow down. Effectively, this is placing damping on the displacer movement so as to bring the displacement and velocity into phase or substantially so. Additionally, the signal from the amplifier 11 is differentiated in 12 to provide a signal representative of displacer acceleration, and integrated in 13 to provide a signal representative of springiness of the system, and the acceleration and springiness representative signals are also subtracted from the motor drive signal whereby electrically the inertia and springiness of the system are effectively reduced and the displacer in effect moves in a manner which is even closer to a perfect damped system in which this force is in phase with the velocity.

FIG. 5 shows a modified form of wave-making apparatus which can be used with the control circuit of FIG. 4. The liquid displacer 1A is of somewhat different shape and construction. It has the shape as shown which propagates a wave in the forward direction without propagating a wave in the rearward direction. It will be noted that the drive arrangement between the motor and the displacer is different in FIG. 5 but a sensing of displacer velocity and force acting thereon is carried out in a manner similar to that employed with the embodiment of FIG. 3.

In the arrangement of FIG. 5, the displacer 1A is mounted in any suitable manner on a support outside the displacer for rotary movement about axis 3A and is driven from a motor M, gear train and tachogenerator unit 6A, 11A through a drive arm 16, pivoted at 17, and a drive strut 18 pivoted to the displacer and to the free end of the arm 16. The electric motor M is operatively connected to the gear train, not shown, within the units 6A, 11A to rotatably drive the pivot shaft 17. As the motor M is driven in one direction, the pivot shaft 17 is rotated in one direction to move the arm 16 up, and thereby turn the displacer 1A upwardly about axis 3A at which it is pivoted by a conventional means, not shown. Reverse rotation of electric motor M, through the same transmission, causes the displacer 1A to move down. The strain gauges 18A are connected to the arm 16 at the roof thereof in order to sense the strain in the arm 16 resulting from the force of the fluid medium against the displacer 1A and transmitted through the drive strut 18 to the arm 16. The tachogenerator T (FIG. 4) may be operatively connected to the rotary shaft within the unit 6A, 11A, such as the motor shaft, in a manner well-known to those skilled in the art. Thus, the force sensed by the strain gauges 18A and the velocity value sensed by the tachogenerator T are converted into electrical signals by the circuit disclosed in FIG. 4, in the same manner as the signals sensed by the apparatus disclosed in FIG. 3.

Figure 6:
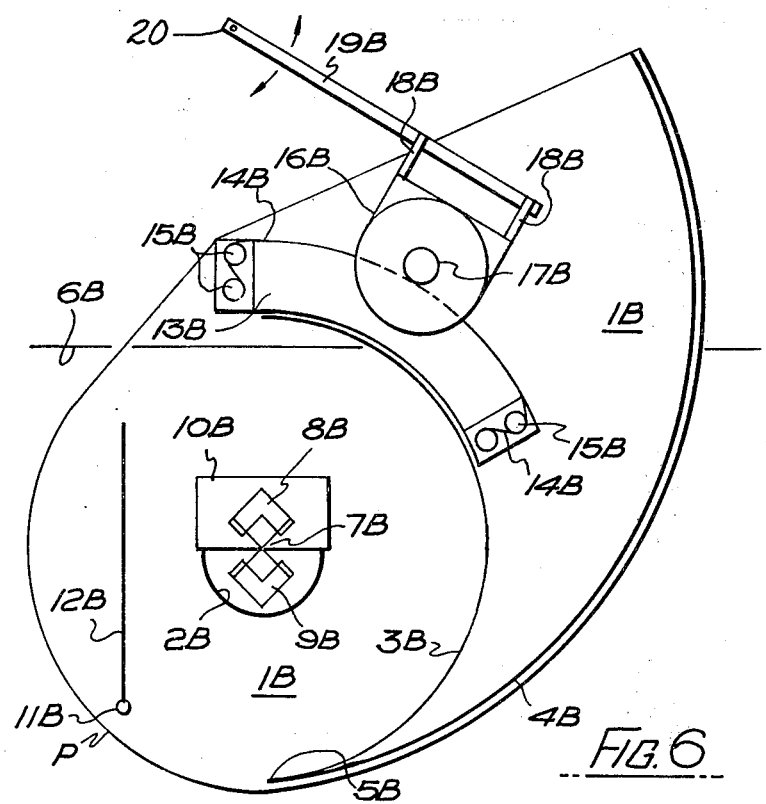
FIG. 6 shows a schematic side elevation of a further modified form of wave making apparatus in accordance with the invention.

FIG. 6 illustrates a modified form of displacer which is more suitable for the larger versions of wave-making apparatus.

The modified displacer is shown in FIG. 6 in a sectional view through the displacer in a plane normal to the turning axis of the displacer.

The displacer of FIG. 6 is formed from two spaced-apart plates 1B (only one of which is shown in FIG. 6) each plate being provided with a circular opening 2B which is concentrically positioned relative to the rear part P of the periphery of the plate 1. The two plates are interconnected by an arcuate rear wall 3B and an arcuate front wall 4B. The walls 3B and 4B are joined together at their lower edges 5B and therefore define a tapering volume which is open at the top and is closed at each end by the side plates.

The liquid displacer is pivotally supported within the tank (typically with the water level at the point marked 6B in FIG. 6) by means of crossed leaf spring supports 7B, the supports being secured between "L" bars 8B and 9B, the bar 8B being secured at its ends to plates 10B attached to the side plates of the liquid displacer, while the bar 9B passes through the opening 2B in each side plate and is secured (in any suitable manner) to some external support outside the liquid displacer. A bar 11B extends between the side plates in the position indicated in FIG. 6 and is connected to a flexible strand 12B (e.g., of wire) which is attached to a buoyancy balancing device (not shown but located above the water level 6), the upwardly directed force exerted by the balancing device on the strand 12B varying during the reciprocating motion of the liquid displacer about its axis defined by the crossed leaf supports 7B is such as to fully compensate for the buoyancy force exerted on the liquid displacer caused by the differing depths of insertion of the closed hollow volume formed between the walls 3B and 4B.

On each side plate, between the walls 3B and 4B is secured a sector plate 13B along the upper edge of which is disposed a flexible multi-strand stainless steel wire 14B. The opposite ends of the wire 14B are wrapped around pins 15B and a loop of the wire is taken around a threaded pulley 17B secured to the drive shaft of an electric motor 16B. Since there is an arcuate plate secured to each side plate, two motors are employed and these are fed with electrical current from the opposite halves of a dual power supply.

When the motors are energised, the pulleys 17B rotate and by virtue of their engagement with the loops of wire 14B, rocking of the liquid displacer about its axis in one direction results. Energising the motors with the opposite polarity reverses the direction of rock. The amplitude of rock and the speed of rock can clearly be controlled by the duration of current supply in each directional pulse and by the amplitude of current supply.

Each motor is mounted via a pair of strain gauge strips 18B to a swinging arm 19B pivoted to a fixed support at 20.

As is described hereinbefore, with reference to FIG. 4 control of the motor 16B is a function of the forces exerted on the strain gauge strips 18B, and its own velocity which is sensed by a tachogenerator T, but could be efficiently sensed by an independent transducer such as a microammeter movement linked independently to the displacer. The microammeter and the displacer can be coupled by a simple linkage.

Backlash in the drive between the motors 16B and the wires 14B can again be avoided by ensuring that when the liquid displacer is in a stationary position, a small residual current is passing through each motor to generate oppositely directed forces on the two side plates as explained hereinbefore.

The liquid displacer shown in FIG. 6 has been designed for a maximum angular excursion of ±30°, but in practice with all embodiments rocking, oscillations not in excess of ±15° would normally be employed.

By locating the bar 11B between the 6 o'clock and 9 o'clock positions an over-centre spring action results which aids in reducing the effect of spring and inertia on the movement of the displacer, thus making the movement of the displacer more dependent on the damping forces.

Although the front wall 4B has been shown as the arc of a circle, a slightly improved performance would be obtained were this to deviate from the strict circular shape to achieve more accurate matching of the characteristics of the displacer to the buoyancy spring employed at the other end of the strand 12B. It is doubtful that the marginal advantage obtained by a non-circular curve for the front wall 4B would justify the more complicated manufacturing techniques necessary to produce it.

The strand 12B can be replaced by a helical spring, and the location of the bar 11B can be varied between 45° and 55° between the horizontal.

The wire drive 14B, 17B of the embodiment of FIG. 6 and also that of FIG. 3 can be replaced by a friction drive (e.g. a roller bearing against an arcuate drive surface replacing the wires).

To facilitate ready setting up of the apparatus described, the sector plates of the FIG. 6 embodiment can be removably mounted on the side plates.

The design of wave making apparatus described can easily follow electronic command signals with a flat response in the middle of its working range. Mixed sea spectra are readily generated and the design allows much improved wave height stability, a few parts per thousand for mid-scale waves to be obtained. The apparatus described can even be used to produce stable standing waves. It is possible to use two of the wave making apparatuses described with one sending its waves at another, and this has not been possible heretofore. It makes possible testing the models in bidirectional seas which are found in places like the Pentland Firth.

The design of a liquid displacer which gives rise to unidirectional waves (e.g. those shown in FIGS. 2, 3, 5 and 6, represents a further aspect of the invention.

I claim

1. Apparatus for creating surface waves in a body of liquid comprising a liquid displacer, means for mounting said displacer at a pre-determined depth below the surface of the body of liquid, for back and forward movement, motive means for moving the liquid displacer back and forth to create the waves in the body of liquid, means for sensing the reaction force of the liquid on the displacer, means in an electrical circuit for generating a signal related to said reaction force, means included in said electrical circuit for controlling the movement of the displacer with said signal to make the displacer behave as a damped system in which said reaction force on the displacer and its motion are substantially in phase, whereby the displacer can not only create waves but also absorb waves impinging on said displacer.

2. Apparatus according to claim 1, wherein the damping is applied by means which senses the instantaneous resultant force on the displacer and produces a first drive signal dependent thereon which serves to drive the motive means, and means which senses the instantaneous velocity of the displacer and produces a second signal drive signal which is subtracted from the first signal thereby to apply the damping to the displacer.

3. Apparatus according to claim 2, wherein there is a differentiating means which produces from said second signal a signal which is representative of the instantaneous acceleration of the displacer and such signal is also subtracted from the first drive signal thereby to make the system behave as though its inertia were much reduced.

4. Apparatus according to claim 2 including integrating means adapted to produce another signal from said second signal and subtracting means adapted to subtract such signal from said first signal thereby to make the system behave as though its inherent spring stiffness were much reduced.

5. Apparatus according to claim 2 wherein the sensing means of the apparatus comprises electric transducers connected to an electric control circuit.

6. Apparatus according to claim 1, wherein the motive means comprises drive wires connected to the displacer.

7. Apparatus according to claim 1, in which said motive means comprises electric motor means, and a speed reduction gear box connecting the motor means and the displacer.

8. Apparatus according to claim 1, wherein the displacer is mounted for back and forth movement about a pivot in said apparatus.

9. Apparatus according to claim 8, wherein the liquid displacer includes an active face element which is of continuously increasing radius from the axis of said pivot.

10. Apparatus according to claim 9, wherein the displacer defines a buoyancy cavity behind the active face element, which curves with increasing radius relative to said axis from a base circle having its centre on said axis, and a rear face lying on said base circle.

11. Apparatus according to claim 10, wherein the displacer has spaced side plates between which said cavity is located.

12. Apparatus according to claim 11, wherein the displacer is supported by crossed leaf springs.

13. Apparatus according to claim 11, including a buoyancy balancing device adapted to apply a force to the displacer to balance buoyancy forces on the displacer.

14. Apparatus according to claim 13, including means for varying the force applied to the displacer by said buoyancy balancing device in order fully to compensate for said buoyancy forces exerted on the liquid displacer caused by differing depths of insertion of the displacer in the liquid.

* * * * *